(12) United States Patent
Hikosaka et al.

(10) Patent No.: US 10,189,102 B2
(45) Date of Patent: Jan. 29, 2019

(54) ELECTRIC DISCHARGE MACHINE

(71) Applicant: Mitsubishi Electric Corporation, Chiyoda-ku (JP)

(72) Inventors: Hiroki Hikosaka, Tokyo (JP); Kazunari Morita, Tokyo (JP); Hiroshi Yoshikawa, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/749,282

(22) PCT Filed: Oct. 20, 2015

(86) PCT No.: PCT/JP2015/079606
§ 371 (c)(1),
(2) Date: Jan. 31, 2018

(87) PCT Pub. No.: WO2017/068654
PCT Pub. Date: Apr. 27, 2017

(65) Prior Publication Data
US 2018/0221977 A1 Aug. 9, 2018

(51) Int. Cl.
*B23H 1/02* (2006.01)
*B23H 7/18* (2006.01)
(Continued)

(52) U.S. Cl.
CPC .............. *B23H 1/02* (2013.01); *B23H 7/16* (2013.01); *B23H 7/18* (2013.01); *B23H 7/30* (2013.01); *B23H 7/20* (2013.01); *B23H 9/006* (2013.01)

(58) Field of Classification Search
CPC ... B23H 1/02; B23H 7/16; B23H 7/18; B23H 7/20; B23H 7/30
See application file for complete search history.

(56) References Cited

U.S. PATENT DOCUMENTS 5,496,984 A       3/1996   Goto et al.
5,603,852 A   *   2/1997   Goto ..................... B23H 1/02
                                                    219/69.13
(Continued)

FOREIGN PATENT DOCUMENTS

JP    53-85898 A   *   7/1978
JP    4-304925 A        10/1992
(Continued)

OTHER PUBLICATIONS

Machine translation of Japan Patent document No. 06-126,534, Jun. 2018.*

(Continued)

*Primary Examiner* — Geoffrey S Evans
(74) *Attorney, Agent, or Firm* — Oblon, McClelland, Maier & Neustadt, L.L.P.

(57) ABSTRACT

An electric discharge machine includes an electrode, a shaft-feed driving unit that, a voltage/current applying unit, a shaft-feed control unit that causes the shaft-feed driving unit to perform a jump operation, and a machining-condition setting and changing unit that sets a voltage applied between the electrode and a workpiece and an electric current flowing between the electrode and the workpiece. The machining-condition setting and changing unit determines whether the electric discharge between the electrode and the workpiece stabilizes after the jump operation ends and, in at least a part of a period before determining that the electric discharge stabilizes, sets at least one of the voltage and the electric current to a condition in which electric discharge more easily occurs than in the condition in applying the electric discharge machining.

9 Claims, 14 Drawing Sheets

(51) Int. Cl.
   *B23H 7/30*    (2006.01)
   *B23H 7/16*    (2006.01)
   *B23H 9/00*    (2006.01)
   *B23H 7/20*    (2006.01)

(56) References Cited

U.S. PATENT DOCUMENTS

| 8,093,528 | B2 | 1/2012 | Boccadoro et al. |
| 2008/0116174 | A1* | 5/2008 | Boccadoro ............. B23H 1/022 |
| | | | 219/69.17 |
| 2010/0096364 | A1* | 4/2010 | Balemi ................... B23H 7/16 |
| | | | 219/69.13 |

FOREIGN PATENT DOCUMENTS

| JP | 5-293714 A | | 11/1993 |
| JP | 06-126534 A | * | 5/1994 |
| JP | 10-43946 A | | 2/1998 |
| JP | 10-187219 A | | 7/1998 |
| JP | 2002-154013 A | | 5/2002 |
| JP | 2002-172525 A | | 6/2002 |
| JP | 2004-283987 A | | 10/2004 |
| JP | 2006-142479 A | | 6/2006 |
| JP | 2008-114362 A | | 5/2008 |
| JP | 2011-218459 A | | 11/2011 |
| JP | 2012-115962 A | | 6/2012 |

OTHER PUBLICATIONS

International Search Report dated Dec. 15, 2015 in PCT/JP2015/079606 filed Oct. 20, 2015.
Decision of Patent Grant dated Aug. 29, 2016 in JP 2016-524612 (with English Translation).

* cited by examiner

ELECTRIC DISCHARGE MACHINE

FIELD

The present invention relates to an electric discharge machine that applies a machining voltage to an electrode and a workpiece and applies electric discharge machining to the workpiece.

BACKGROUND

A die sinking electric discharge machine generally performs a jump operation at every fixed time for the purpose of discharging machining chips produced during machining (see, for example, Patent Literature 1 and Patent Literature 2). In a period from a jump operation end until electric discharge stabilizes, the electric discharge machine reduces moving speed of an electrode on the basis of a position of the electrode before the jump operation and gently brings the electrode close to the workpiece to avoid collision of the electrode and the workpiece.

CITATION LIST

Patent Literature

Patent Literature 1: Japanese Patent Application Laid-Open No. 2006-142479
Patent Literature 2: Japanese Patent Application Laid-Open No. 2011-218459

SUMMARY

Technical Problem

The electric discharge machine disclosed in Patent Literature 1 and Patent Literature 2 starts electric discharge when a voltage set in machining conditions is applied after the jump operation ends and the distance between the electrode and the workpiece reaches a dielectric breakage distance. The number of electric discharges gradually increases. However, in the electric discharge machine disclosed in Patent Literature 1 and Patent Literature 2, electric discharge less easily occurs immediately after the jump operation ends. Machining speed sometimes decreases because the number of electric discharges is small. The electric discharge machine disclosed in Patent Literature 1 and Patent Literature 2 is capable of improving the machining speed by increasing the moving speed of the electrode immediately after the jump operation ends. However, the electrode and the workpiece easily collide when the moving speed of the electrode is increased. Therefore, in the electric discharge machine, it is difficult to increase the moving speed of the electrode and it is difficult to suppress a decrease in the machining speed.

The present invention has been devised in view of the above, and an object of the present invention is to obtain an electric discharge machine that can suppress a decrease in machining speed.

Solution to Problem

In order to solve the aforementioned problem and achieve the object, an electric discharge machine according to the present invention includes: an electrode opposed to a workpiece; a shaft-feed driving unit to move the electrode in a direction in which the electrode is brought close to the workpiece and a direction in which the electrode moves away from the workpiece; a voltage/current applying unit to apply a voltage between the electrode and the workpiece to cause electric discharge and feed an electric current between the electrode and the workpiece; a shaft-feed control unit to cause the shaft-feed driving unit to perform a jump operation during a machining operation; and a machining-condition setting unit to set the voltage applied between the electrode and the workpiece by the voltage/current applying unit and the electric current flowing between the electrode and the workpiece. The machining-condition setting unit determines whether the electric discharge between the electrode and the workpiece stabilizes after the jump operation ends and, in at least a part of a period before determining that the electric discharge stabilizes, sets at least one of the voltage and the electric current to a condition in which electric discharge more easily occurs than in a condition at a time when electric discharge machining is applied.

Advantageous Effects of Invention

According to the present invention, there is an effect that it is possible to suppress a decrease in the machining speed.

DESCRIPTION OF EMBODIMENTS

Electric discharge machines according to embodiments of the present invention are explained in detail below with reference to the drawings. Note that the present invention is not limited by the embodiments.

First Embodiment

Figure 1:
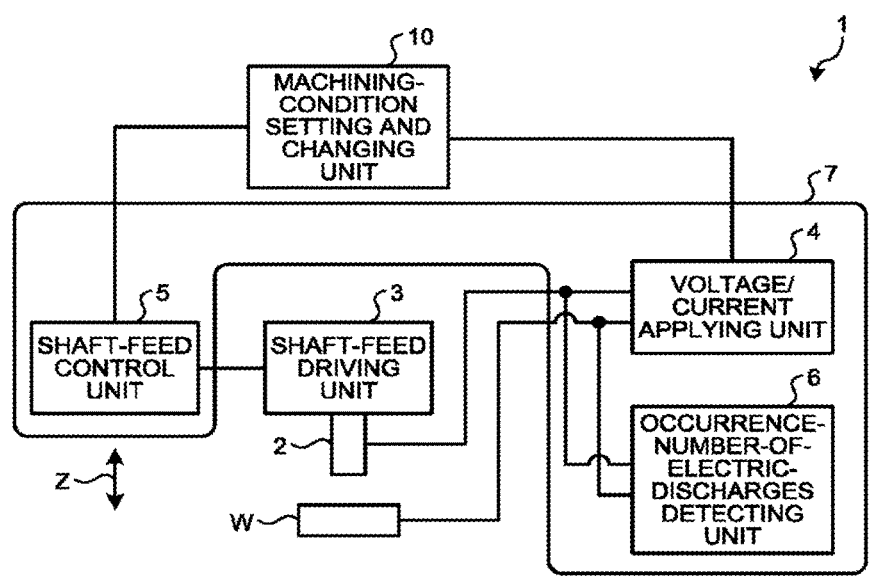
FIG. 1 is a diagram illustrating the configuration of an electric discharge machine according to a first embodiment of the present invention.
Figure 2:
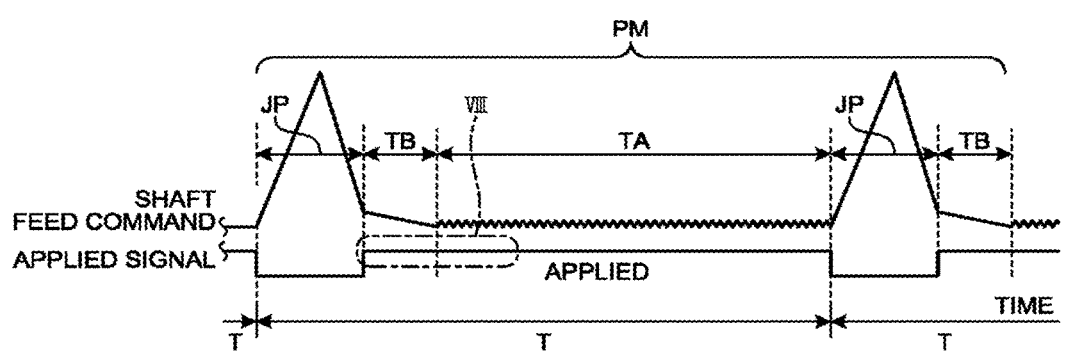
FIG. 2 is a diagram illustrating a shaft feed command and an applied signal during a machining operation of the electric discharge machine according to the first embodiment of the present invention.
Figure 3:
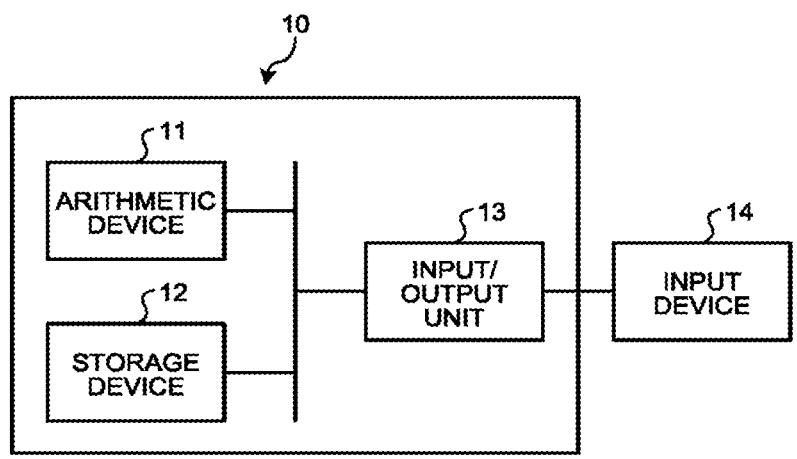
FIG. 3 is a diagram illustrating an example of the configuration of hardware of a machining-condition setting and changing unit of the electric discharge machine according to the first embodiment of the present invention.

FIG. 1 is a diagram illustrating the configuration of an electric discharge machine according to a first embodiment of the present invention. FIG. 2 is a diagram illustrating a shaft feed command and an applied signal during a machining operation of the electric discharge machine according to the first embodiment of the present invention. FIG. 3 is a diagram illustrating an example of the configuration of hardware of a machining-condition setting and changing unit of the electric discharge machine according to the first embodiment of the present invention.

An electric discharge machine 1 applies, to the workpiece W, electric discharge machining TA (illustrated in FIG. 2) for applying a voltage VP (illustrated in FIG. 8) between an electrode 2 and the workpiece W, causing electric discharge between the electrode 2 and the workpiece W, and removing a part of the workpiece W with the electric discharge. In the first embodiment, the electric discharge machine 1 applies die sinking electric discharge machining TA to the workpiece W. However, the electric discharge machine 1 is not limited to the die sinking electric discharge machining TA and can apply wire electric discharge machining.

The electric discharge machine 1 includes, as illustrated in FIG. 1, the electrode 2 opposed to the workpiece W, a shaft-feed driving unit 3 that moves the electrode 2 in a direction in which the electrode 2 is brought close to the workpiece W and a Z direction in which the electrode 2 moves away from the workpiece W, and a voltage/current applying unit 4 that applies the voltage VP between the electrode 2 and the workpiece W to cause electric discharge and feeds an electric current AP (illustrated in FIG. 8) between the electrode 2 and the workpiece W. The electric discharge machine 1 includes a shaft-feed control unit 5 that causes the shaft-feed driving unit 3 to perform a jump operation JP (illustrated in FIG. 2) at every fixed time T (illustrated in FIG. 2) of a machining operation PM (illustrated in FIG. 2) of the electric discharge machine 1, an occurrence-number-of-electric-discharges detecting unit 6 that detects that electric discharge occurs between the electrode 2 and the workpiece W, and a machining-condition setting and changing unit 10, which is a machining-condition setting unit that sets machining conditions, which are a value of the voltage VP, a value of the electric current AP, and a machining position of the electrode 2, in the voltage/current applying unit 4 and the shaft-feed control unit 5.

The electrode 2 is configured by a conductor. The shaft-feed driving unit 3 includes a ball screw, a motor that rotates the ball screw, and an electrode holder that moves with the ball screw and holds the electrode 2. Note that, in the first embodiment, the Z direction is parallel to a direction in which the electrode 2 and the workpiece W are opposed to each other. However, the Z direction is not limited to this. In the first embodiment, although the shaft-feed driving unit 3 includes the ball screw and the motor that rotates the ball screw, the shaft-feed driving unit 3 can include a linear motor and a guide moved by the linear motor.

The voltage/current applying unit 4 includes a not-illustrated direct-current power supply and applies the pulse-like voltage VP for the electric discharge machining TA between the electrode 2 and the workpiece W on the basis of the machining conditions input from the machining-condition setting and changing unit 10. A value and a frequency of the pulse-like voltage VP applied between the electrode 2 and the workpiece 4 by the voltage/current applying unit 4 are decided according to the machining conditions input from the machining-condition setting and changing unit 10. Electric discharge is caused between the electrode 2 and the workpiece W by the voltage VP applied by the voltage/current applying unit 4. The electric discharge machining TA of the workpiece W by the electrode 2 is performed. The voltage/current applying unit 4 controls, on the basis of the machining conditions input from the machining-condition setting and changing unit 10, a value of the electric current AP flowing according to the electric discharge caused between the electrode 2 and the workpiece W. A value and a frequency of the pulse-like electric current AP fed between the electrode 2 and the workpiece W by the voltage/current applying unit 4 are decided by the machining conditions input from the machining-condition setting and changing unit 10. In the first embodiment, the voltage-current applying unit 4 is capable of changing, independently from each other, the value of the voltage VP applied between the electrode 2 and the workpiece W and the value of the electric current AP flowing between the electrode 2 and the workpiece W according to the electric discharge. However, the voltage/current applying unit 4 can change the value of the voltage VP and the value of the electric current AP in association with each other.

The shaft-feed control unit 5 causes the shaft-feed driving unit 3 to move the electrode 2 in the Z direction on the basis of the machining conditions input from the machining-condition setting and changing unit 10. The occurrence-number-of-electric-discharges detecting unit 6 monitors the voltage VP applied between the electrode 2 and the workpiece W to estimate an occurrence number of electric discharges. The occurrence-number-of-electric-discharges detecting unit 6 outputs a detection result to the machining-condition setting and changing unit 10. The machining-condition setting and changing unit 10 executes a numerical control program and controls the operations of the units of the electric discharge machine 1. The machining-condition setting and changing unit 10 sets the voltage VP applied between the electrode 2 and the workpiece W by the voltage/current applying unit 4 and the electric current AP flowing between the electrode 2 and the workpiece W.

In the first embodiment, the voltage/current applying unit 4, the shaft-feed control unit 5, and the occurrence-number-of-electric-discharges detecting unit 6 are configured by a circuit unit 7 including electronic components configuring an analog circuit and a logical circuit and a substrate mounted with the electronic components. However, the voltage/current applying unit 4, the shaft-feed control unit 5, and the occurrence-number-of-electric-discharges detecting unit 6 are not limited to this.

In the first embodiment, as illustrated in FIG. 3, the machining-condition setting and changing unit 10 is configured by a computer including an arithmetic device 11 such as a central processing unit (CPU) and a random access memory (RAM), a read only memory (ROM), a hard disk drive, a storage device, or a storage device 12 obtained by combining the RAM, the ROM, the hard disk drive, and the storage device, the storage device 12 retaining a numerical control program. The arithmetic device 11 executes the numerical control program retained by the storage device 12 to generate machining conditions and outputs the machining conditions to the units of the electric discharge machine 1, whereby the machining-condition setting and changing unit 10 controls the operations of the units of the electric discharge machine 1. In the first embodiment, information necessary for generating the machining conditions is input to the machining-condition setting and changing unit 10 from an input device 14 connected to an input/output unit 13. The input device 14 is configured by a touch panel, a keyboard, a mouse, a trackball, or a combination of the foregoing.

The electric discharge machine 1 performs the machining operation PM with the workpiece W and the electrode 2 immersed in work fluid configured by pure water or machining oil filled in a not-illustrated work tank. In the machining operation PM, as illustrated in FIG. 2, the electric discharge machine 1 performs the jump operation JP at every fixed time T and applies the electric discharge machining TA to the workpiece W during the jump operation JP. The jump operation JP is an operation for stopping applying the voltage VP between the electrode 2 and the workpiece W and, after once further separating the electrode 2 from the workpiece W than during the electric discharge machining TA, bringing the electrode 2 close to the workpiece W again. The jump operation JP is an operation for separating the electrode 2 from the workpiece W to cause the work fluid into between the electrode 2 and the workpiece W and bringing the electrode 2 close to the workpiece W to discharge, from between the electrode 2 and the workpiece W, the work fluid including machining chips produced by the electric discharge machining TA. Therefore, the jump operation JP refers to an operation for once separating the electrode 2 from the workpiece W and then bringing the electrode 2 close to the workpiece W while the voltage/current applying unit 4 stops applying the voltage VP between the electrode 2 and the workpiece W. The fixed time T is a time from the start of the jump operation JP until the start of the next jump operation JP.

Note that, in FIG. 2, a shaft feed command that the shaft-feed control unit 5 outputs to the shaft-feed driving unit 3 on the basis of the machining conditions input from the machining-condition setting and changing unit 10 to move the electrode 2 and an applied signal for the voltage-current applying unit 4 to apply the voltage VP between the electrode 2 and the workpiece W on the basis of the machining conditions input from the machining-condition setting and changing unit 10 are illustrated according to the elapse of time. The shaft feed command indicates that the electrode 2 is separated from the workpiece W toward the upper side in FIG. 2 and the electrode 2 is brought close to the workpiece W toward the lower side in FIG. 2.

In the first embodiment, the electric discharge machine 1 moves the electrode 2 at speed of 0.1 m/min or more and 40 m/min or less and performs the jump operation JP. As illustrated in FIG. 2, the electric discharge machine 1 ends the jump operation JP before the electrode 2 approaches the workpiece W to a distance before performing the jump operation JP. A position of the electrode 2 for ending the jump operation JP is a position as close as possible to the workpiece W among positions where the electrode 2 does not come into contact with the workpiece W even if the electrode 2 is brought close to the workpiece W to the distance before performing the jump operation JP at lower speed than the jump operation JP after the jump operation JP ends. In this embodiment, when the electrode 2 is located in a position further separated by 10 micrometer or more and 200 micrometers or less than the distance from the workpiece W before performing the jump operation JP, the electric discharge machine 1 ends the jump operation JP. However, an end position of the jump operation JP is not limited to this.

When bringing the electrode 2 close to the workpiece W to the distance before performing the jump operation JP after the jump operation JP ends, the electric discharge machine 1 applies the voltage VP between the electrode 2 and the workpiece W and moves the electrode 2 at lower speed than the jump operation JP. Note that, in the first embodiment, a period from a time when the jump operation JP ends until the electrode 2 approaches the distance from the workpiece W before performing the jump operation JP is referred to as electric discharge induction necessary band TB (illustrated in FIG. 2). That is, moving speed of the electrode 2 approaching the workpiece W in the electric discharge induction necessary band TB is lower than moving speed of the electrode 2 approaching the workpiece W in the jump operation JP. The electric discharge machine 1 sets the electric discharge induction necessary band TB in a period from the end of the jump operation JP until the electric discharge machining TA to suppress a required time of the jump operation JP and prevent the electrode 2 from coming into contact with the workpiece W after the jump operation JP.

As illustrated in FIG. 2, the electric discharge machine 1 applies the electric discharge machining TA to the workpiece W in a period from a time when the electrode 2 approaches the distance from the workpiece W before performing the jump operation JP in the electric discharge induction necessary band TB until the next jump operation JP. While the electric discharge machine 1 applies the electric discharge machining TA, the shaft-feed driving unit 3 adjusts the distance between the electrode 2 and the workpiece W such that the number of electric discharges, which is an occurrence number of electric discharges per unit time, detected by the occurrence-number-of-electric-discharges detecting unit 6 is a number based on the machining conditions input from the machining-condition setting and changing unit 10. In this way, in the first embodiment, the electric discharge machining TA is performed while the voltage VP is applied between the electrode 2 and the workpiece W in the period from the end of the electric discharge induction necessary band TB until the next jump operation JP. In the first embodiment, the machining operation PM of the electric discharge machine 1 refers to the entire machining operation PM of the electric discharge machine 1 including the jump operation JP, the electric discharge induction necessary band TB, and the electric discharge machining TA.

Figure 4:
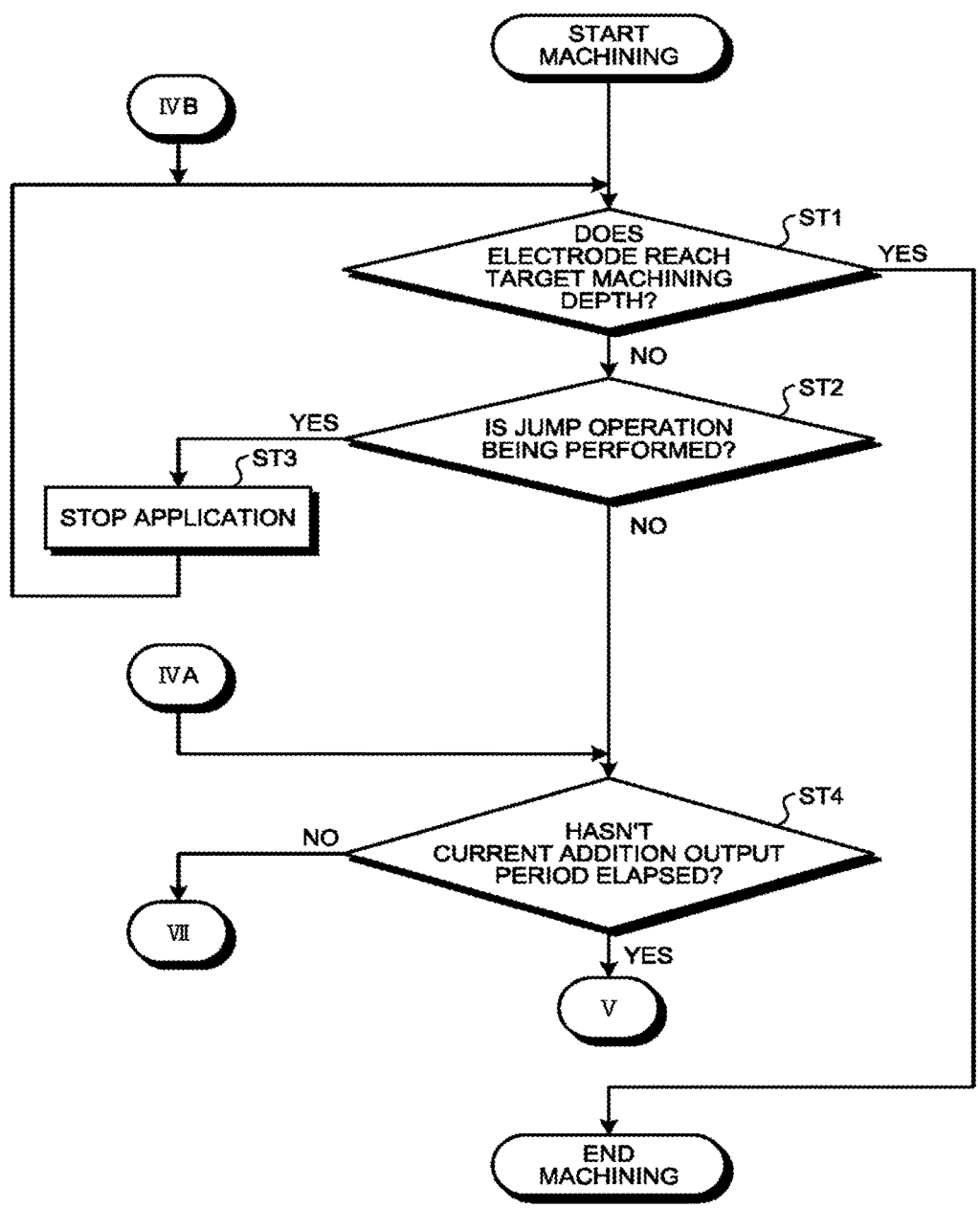
FIG. 4 is a flowchart illustrating a part of the machining operation of the electric discharge machine according to the first embodiment of the present invention.
Figure 5:
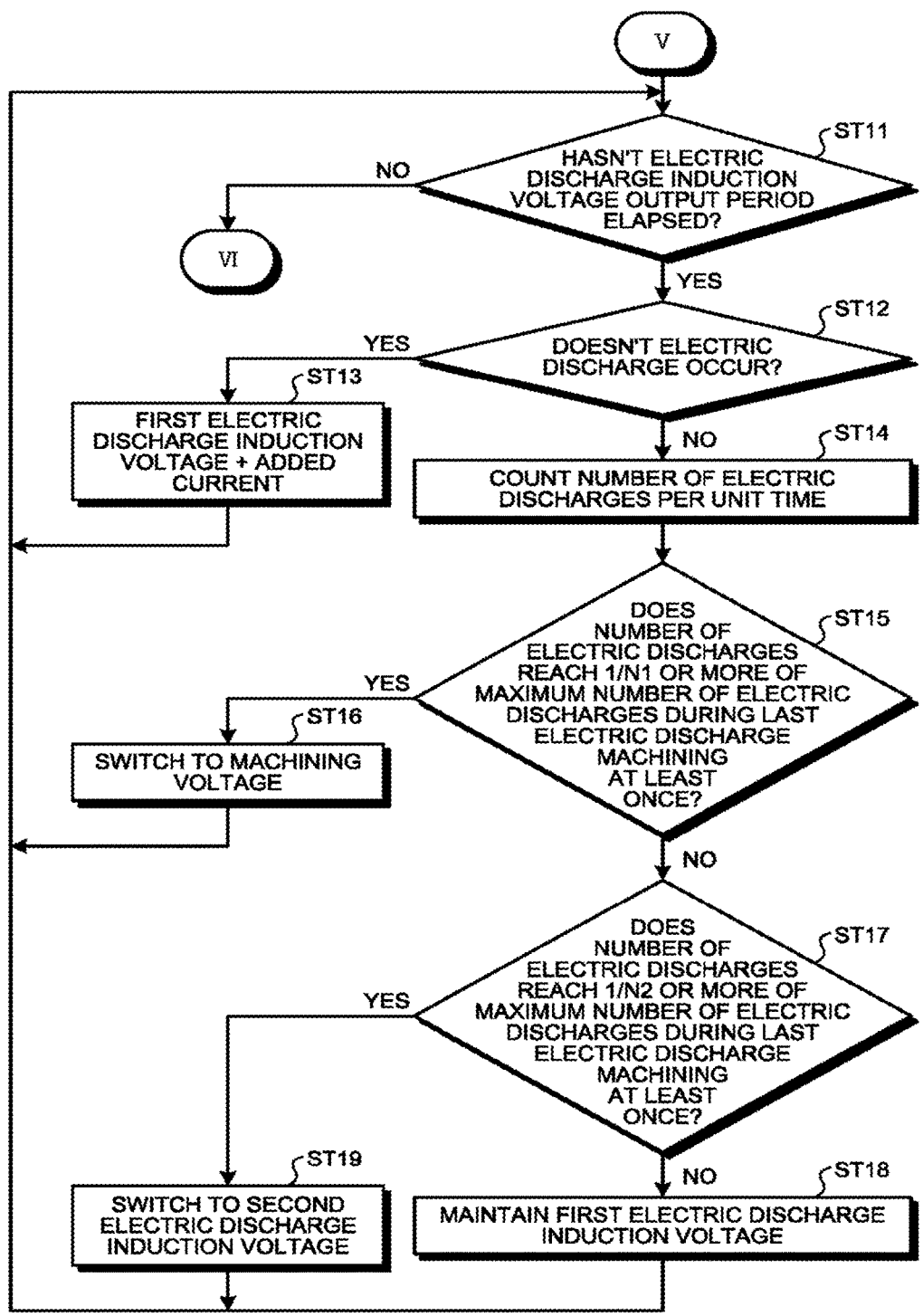
FIG. 5 is a flowchart illustrating a part of the machining operation of the electric discharge machine according to the first embodiment of the present invention.
Figure 6:
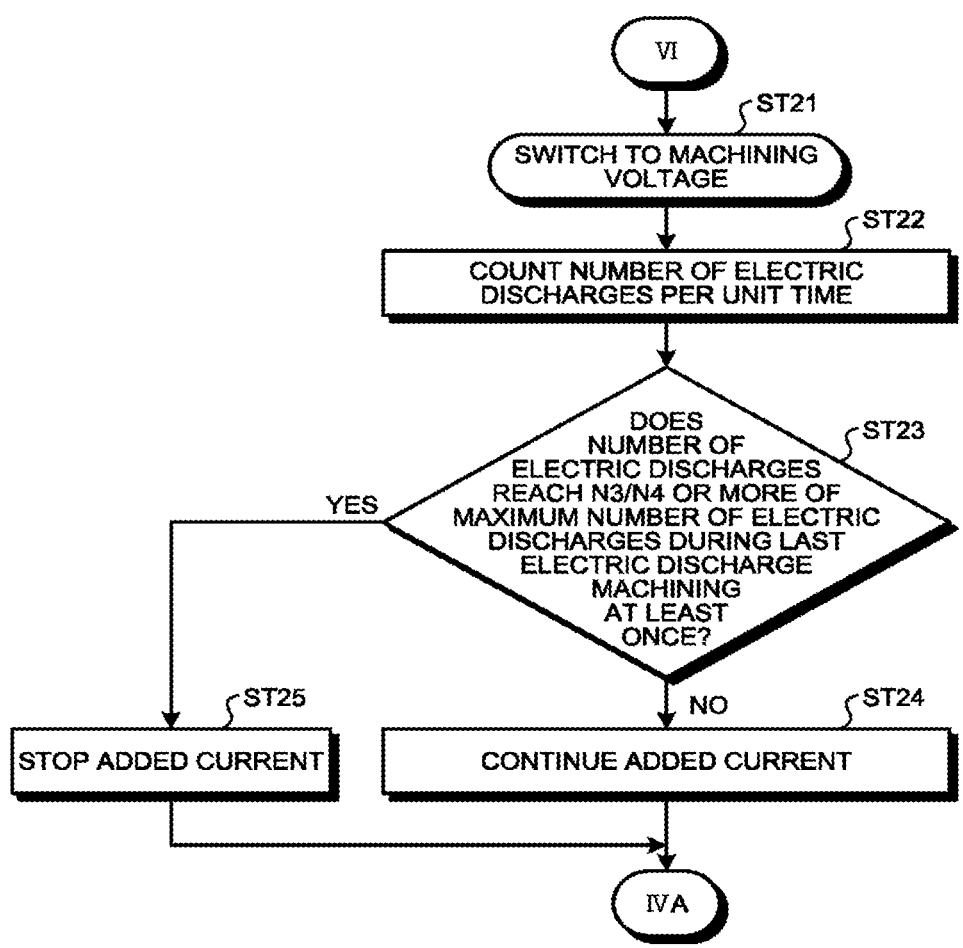
FIG. 6 is a flowchart illustrating a part of the machining operation of the electric discharge machine according to the first embodiment of the present invention.
Figure 7:
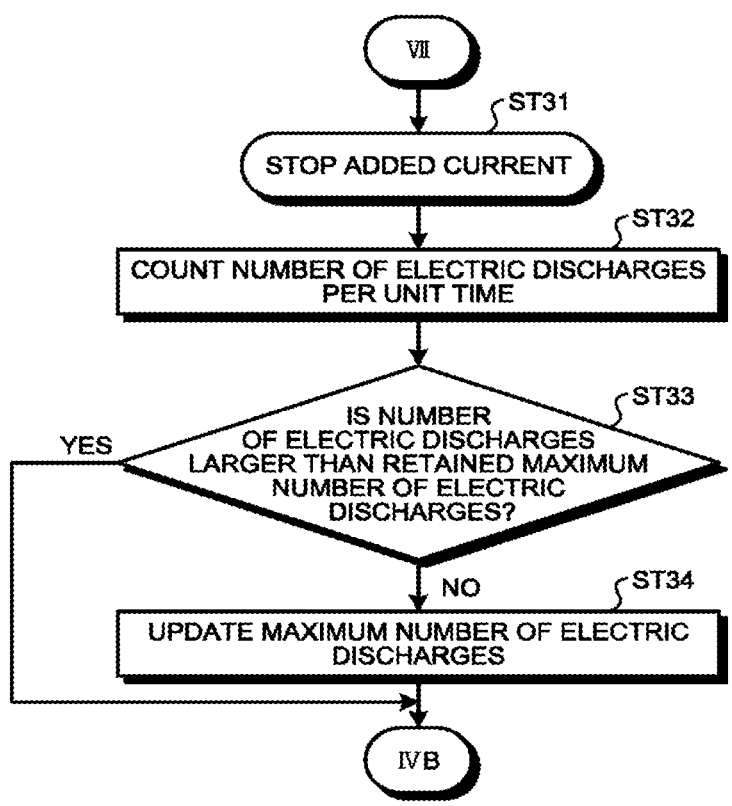
FIG. 7 is a flowchart illustrating a part of the machining operation of the electric discharge machine according to the first embodiment of the present invention.
Figure 8:
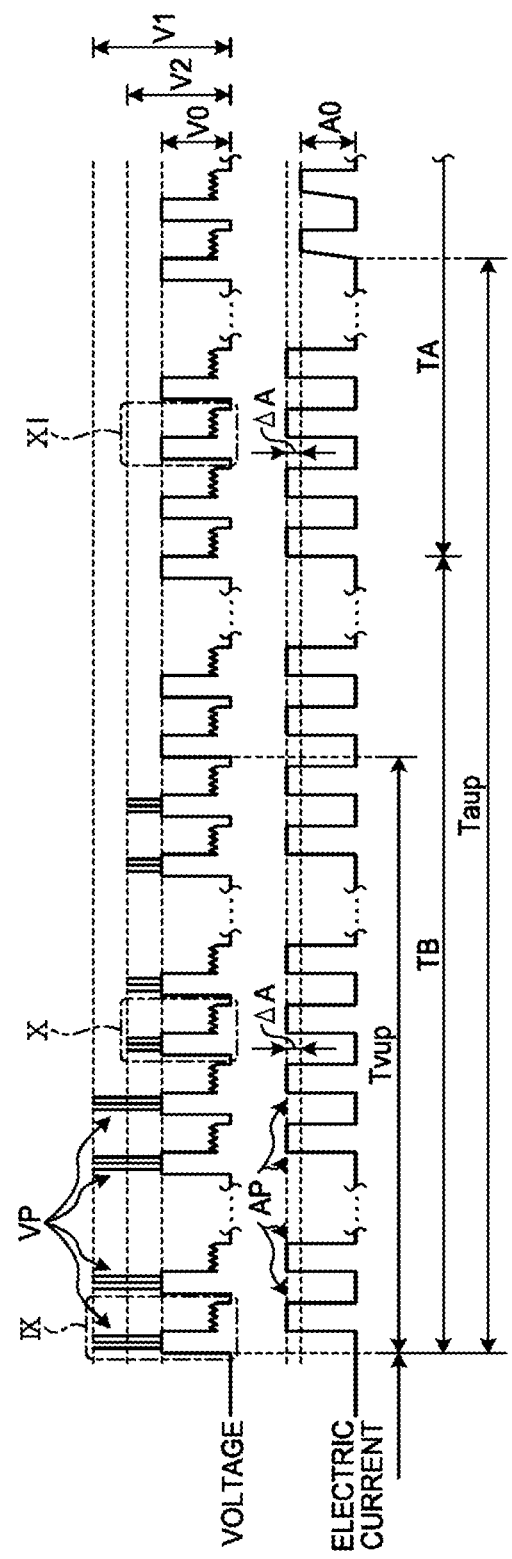
FIG. 8 is a diagram illustrating changes in a voltage and an electric current in a VIII part in FIG. 2.
Figure 9:
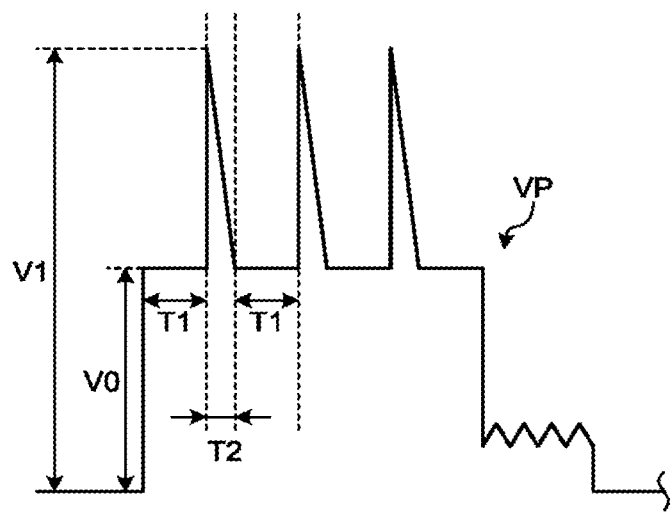
FIG. 9 is a diagram illustrating a change in the voltage in a IX part in FIG. 8.
Figure 10:
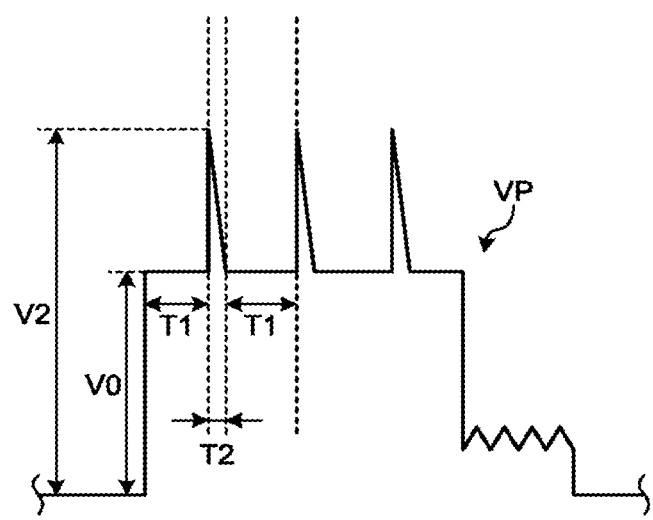
FIG. 10 is a diagram illustrating a change in the voltage in a X part in FIG. 8.
Figure 11:
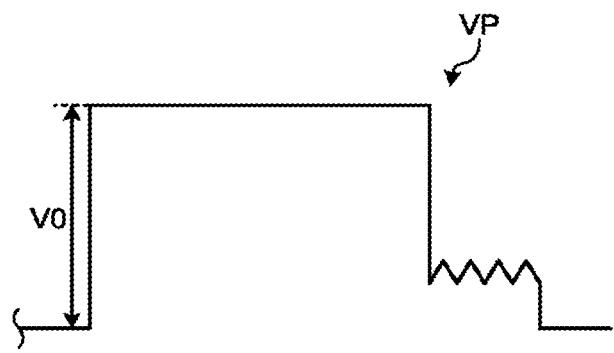
FIG. 11 is a diagram illustrating a change in the voltage in a XI part in FIG. 8.

The machining operation PM of the electric discharge machine 1 according to the first embodiment is explained with reference to the drawings. FIG. 4 is a flowchart illustrating a part of the machining operation of the electric discharge machine according to the first embodiment of the present invention. FIG. 5 is a flowchart illustrating a part of the machining operation of the electric discharge machine according to the first embodiment of the present invention. FIG. 6 is a flowchart illustrating a part of the machining operation of the electric discharge machine according to the first embodiment of the present invention. FIG. 7 is a flowchart illustrating a part of the machining operation of the electric discharge machine according to the first embodiment of the present invention. FIG. 8 is a diagram illustrating changes in a voltage and an electric current in a VIII part in FIG. 2. FIG. 9 is a diagram illustrating a change in the voltage in a IX part in FIG. 8. FIG. 10 is a diagram illustrating a change in the voltage in a X part in FIG. 8. FIG. 11 is a diagram illustrating a change in the voltage in a XI part in FIG. 8.

Information necessary for generating machining conditions is input to the machining-condition setting and changing unit 10 from the input device 14 and a machining start command is input, whereby the electric discharge machine 1 starts the machining operation PM. In the machining operation PM, the machining-condition setting and changing unit 10 of the electric discharge machine 1 generates machining conditions on the basis of the input information and outputs the generated machining conditions to the shaft-feed control unit 5 and the voltage/current applying unit 4. Then, in the electric discharge machine 1, as illustrated in FIG. 2, the shaft-feed control unit 5 outputs a shaft feed command to the shaft-feed driving unit 3. The voltage/current applying unit 4 applies the voltage VP between the electrode 2 and the workpiece W. Note that, in the electric discharge machine 1, during the electric discharge machining TA, the voltage/current applying unit 4 applies, between the electrode 2 and the workpiece W, a machining voltage V0 (illustrated in FIG. 8), which is a condition in applying the electric discharge machining TA, based on the machining conditions input from the machining-condition setting and changing unit 10. The voltage/current applying unit 4 feeds, between the electrode 2 and the workpiece W, a machining current A0 (illustrated in FIG. 8), which is a condition in applying the electric discharge machining TA, based on the machining conditions input from the machining-condition setting and changing unit 10.

The machining-condition setting and changing unit 10 of the electric discharge machine 1 determines, in the machining operation PM, whether the electrode 2 reaches a target machining depth (step ST1). In the first embodiment, the machining-condition setting and changing unit 10 determines on the basis of the machining conditions output to the shaft-feed control unit 5 whether the electrode 2 reaches the target machining depth, that is, whether the distance from the workpiece W in the Z direction reaches a target distance. However, the machining-condition setting and changing unit 10 is not limited to this. When determining that the electrode 2 reaches the target machining depth (Yes at step ST1), the machining-condition setting and changing unit 10 ends the machining. When determining that the electrode 2 does not reach the target machining depth (No at step ST1), the machining-condition setting and changing unit 10 determines whether the jump operation JP is being performed (step ST2). The machining-condition setting and changing unit 10 determines on the basis of the machining conditions output to the shaft-feed control unit 5 or an elapsed time from the machining start whether the jump operation JP is being performed. However, the machining-condition setting and changing unit 10 is not limited to this. When determining that the jump operation JP is being performed (Yes at step ST2), the machining-condition setting and changing unit 10 outputs a machining condition for stopping the application of the voltage VP to the voltage/current applying unit 4. The voltage/current applying unit 4 stops the application of the voltage VP (step ST3). Thereafter, the processing returns to step ST1.

When determining that the jump operation JP is not being performed (No at step ST2), the machining-condition setting and changing unit 10 determines whether a current addition output period Taup (illustrated in FIG. 8) has elapsed after the end of the jump operation JP (step ST4). The current addition output period Taup refers to a period in which the electric current AP higher than the machining current A0 is fed between the electrode 2 and the workpiece W according to electric discharge during the electric discharge machining TA to increase a machining amount per one electric discharge to be larger than a machining amount during the electric discharge machining TA. In the first embodiment, the current addition output period Taup is longer than the electric discharge induction necessary band TB. However, the current addition output period Taup is not limited to this.

When determining that the current addition output period Taup has not elapsed (Yes at step ST4), the machining-condition setting and changing unit 10 determines whether an electric discharge induction voltage output period Tvup (illustrated in FIG. 8) has elapsed after the end of the jump operation JP (step ST11). The electric discharge induction voltage output period Tvup refers to a period in which the voltage VP higher than the machining voltage V0 is applied between the electrode 2 and the workpiece W to make it easy to cause electric discharge, that is, electric discharge is induced to stabilize the occurrence of the electric discharge. In the first embodiment, the electric discharge induction voltage output period Tvup is shorter than the electric discharge induction necessary band TB and the current addition output period Taup. However, the electric discharge induction voltage output period Tvup is not limited to this.

When determining that the electric discharge induction voltage output period Tvup (illustrated in FIG. 8) has not elapsed after the end of the jump operation JP (Yes at step ST11), the machining-condition setting and changing unit 10 determines on the basis of a detection result of the occurrence-number-of-electric-discharges detecting unit 6 whether electric discharge does not occur at all after the end of the jump operation JP (step ST12). Electric discharge less easily occurs immediately after the end of the jump operation JP. Therefore, the machining-condition setting and changing unit 10 determines that electric discharge does not occur at all after the jump operation JP ends (Yes at step ST12) and outputs, to the voltage/current applying unit 4, machining conditions including a condition for applying a first electric discharge induction voltage V1 and feeding the electric current AP of a sum of the machining current A0 and an added current ΔA (step ST13). Then, as illustrated in FIG. 8, the voltage/current applying unit 4 applies the pulse-like first electric discharge induction voltage V1 between the electrode 2 and the workpiece W. When insulation between the electrode 2 and the workpiece W is broken, the electric current AP of the sum of the pulse-like machining current A0 and the added current ΔA flows between the electrode 2 and the workpiece W. Thereafter, the processing returns to step ST11.

In the first embodiment, a value of the first electric discharge induction voltage V1 is higher than a value of the machining voltage V0. In the first embodiment, as illustrated in FIG. 9, the voltage/current applying unit 4 applies the machining voltage V0. When the insulation is not broken, that is, electric discharge does not occur during the application of the machining voltage V0, the voltage/current applying unit 4 applies the first electric discharge induction voltage V1 for a second fixed time T2 at every first fixed time T1 to intermittently apply the first electric discharge induction voltage V1. In the first embodiment, the voltage/current applying unit 4 applies the first electric discharge induction voltage V1 in a saw-tooth waveform inclining to the right. However, the first electric discharge induction voltage V1 is not limited to the saw-tooth waveform and can be applied in a rectangular waveform or a triangular waveform.

In the first embodiment, as illustrated in FIG. 8, when the insulation between the electrode 2 and the workpiece W is broken, that is, electric discharge occurs, the voltage/current applying unit 4 feeds the electric current AP of the sum of the machining current A0 and the added current ΔA between the electrode 2 and the workpiece W according to the electric discharge. In the first embodiment, the voltage/current applying unit 4 feeds the electric current AP of the sum of the machining current A0 and the added current ΔA in a rectangular waveform. However, the electric current AP is not limited to the rectangular waveform and can be fed in a saw-tooth waveform or a triangular waveform. Note that the electric current AP of the sun of the machining current A0 and the added current ΔA is a condition in which electric discharge more easily occurs than at the machining current A0. The machining current A0 and the electric current AP of the sum of the machining current A0 and the added current DA are the pulse-like electric current AP.

When the electric discharge occurs, the machining-condition setting and changing unit 10 determines that the electric discharge occurs after the jump operation JP ends (No at step ST12) and counts the number of electric discharges per unit time on the basis of a detection result of the occurrence-number-of-electric-discharges detecting unit 6 (step ST14). In the first embodiment, the machining-condition setting and changing unit 10 counts the number of electric discharges in 1 millisecond, which is the unit time. However, the unit time is not limited to 1 millisecond.

The machining-condition setting and changing unit 10 determines whether the counted number of electric discharges reaches 1/N1 (N1 is a natural number) of a maximum number of electric discharges during the last and prior electric discharge machining TA before the jump operation JP at least once (step ST15). When determining that the counted number of electric discharges reaches 1/N1 of the maximum number of electric discharges during the last and prior electric discharge machining TA before the jump operation JP at least once (Yes at step ST15), the machining-condition setting and changing unit 10 determines that the electric discharge between the electrode 2 and the workpiece W stabilizes after the jump operation JP ends. The machining-condition setting and changing unit 10 switches the voltage VP applied between the electrode 2 and the workpiece W to the machining voltage V0 (step ST16). Thereafter, the processing returns to step ST11. The machining-condition setting and changing unit 10 outputs, to the voltage/current applying unit 4, machining conditions including a condition for applying the machining voltage V0. As illustrated in FIG. 11, the voltage/current applying unit 4 applies the machining voltage V0 between the electrode 2 and the workpiece W. In the first embodiment, the voltage/current applying unit 4 applies the machining voltage V0 in a rectangular waveform. However, the machining voltage V0 is not limited to the rectangular waveform and can be applied in a saw-tooth waveform or a triangular waveform.

In this way, at step ST15, the machining-condition setting and changing unit 10 determines whether the counted number of electric discharges reaches 1/N1 (N1 is a natural number) of the maximum number of electric discharges during the last and prior electric discharge machining TA before the jump operation JP at least once to determine whether the electric discharge between the electrode 2 and the workpiece W stabilizes after the jump operation JP ends. Note that "the electric discharge stabilizes" refers to a state in which the number of electric discharges in the electric discharge induction necessary band TB after the end of the jump operation JP is closer to the number of electric discharges during the electric discharge machining TA than the number of electric discharges immediately after the end of the jump operation JP. In the first embodiment, the machining-condition setting and changing unit 10 uses "2", which is a natural number, as N1. However, a value of N1 is not limited to 2.

When determining that the counted number of electric discharges does not reach 1/N1 (N1 is a natural number) of the maximum number of electric discharges during the last and prior electric discharge machining TA before the jump operation JP even once (No at step ST15), the machining-condition setting and changing unit 10 determines whether the counted number of electric discharges reaches 1/N2 (N2 is a natural number larger than N1) of the maximum number of electric discharges during the last and prior electric discharge machining TA before the jump operation JP at least once (step ST17). In the first embodiment, the machining-condition setting and changing unit 10 uses "4", which is a natural number, as N2. However, a value of N2 is not limited to 4. When determining that the counted number of electric discharges does not reach 1/N2 (N2 is a natural number larger than N1) of the maximum number of electric discharges during the last and prior electric discharge machining TA before the jump operation JP even once (No a step ST17), the machining-condition setting and changing unit 10 determines that the electric discharge between the electrode 2 and the workpiece W does not stabilize after the jump operation JP ends. The machining-condition setting and changing unit 10 maintains the voltage VP applied between the electrode 2 and the workpiece W at the first electric discharge induction voltage V1 (step ST18). Thereafter, the processing returns to step ST11.

When determining that the counted number of electric discharges reaches 1/N2 (N2 is a natural number) of the maximum number of electric discharges during the last and prior electric discharge machining TA before the jump operation JP at least once (Yes at step ST17), the machining-condition setting and changing unit 10 determines that the electric discharge further stabilizes than when the number of electric discharges does not reach 1/N2 (N2 is a natural number) of the maximum number of electric discharges at all. The machining-condition setting and changing unit 10 switches the voltage VP applied between the electrode 2 and the workpiece W to a second electric discharge induction voltage V2 (step ST19). Thereafter, the processing returns to step ST11. The machining-condition setting and changing unit 10 outputs machining conditions including a condition for applying the second electric discharge induction voltage V2 to the voltage-current applying unit 4. As illustrated in FIG. 10, the voltage-current applying unit 4 applies the second electric discharge induction voltage V2 between the electrode 2 and the workpiece W.

In the first embodiment, a value of the second electric discharge induction voltage V2 is higher than the value of the machining voltage V0 and lower than the value of the first electric discharge induction voltage V1. In the first embodiment, as illustrated in FIG. 10, the voltage/current applying unit 4 applies the machining voltage V0. When the insulation is not broken, that is, electric discharge does not occur during the application of the machining voltage V0, the voltage/current applying unit 4 applies the second electric discharge induction voltage V2 for the second fixed time T2 at every first fixed time T1 to intermittently apply the second electric discharge induction voltage V2. In the first embodiment, the voltage/current applying unit 4 applies the second electric discharge induction voltage V2 in a saw-tooth waveform inclining to the right. However, the second electric discharge induction voltage V2 is not limited to the saw-tooth waveform and can be applied in a rectangular waveform or a triangular waveform. Note that the first electric discharge induction voltage V1 and the second electric discharge induction voltage V2 are conditions in which electric discharge more easily occurs than at the machining voltage V0. The machining voltage V0, the first electric discharge induction voltage V1, and the second electric discharge induction voltage V2 are the pulse-like voltage VP.

In the first embodiment, the first fixed time T1 and the second fixed time T2 indicating timings when the first electric discharge induction voltage V1 and the second electric discharge induction voltage V2 are applied can be selected as appropriate. In the first embodiment, the first fixed time T1 indicating the timing when the first electric discharge induction voltage V1 is applied and the first fixed time T1 indicating the timing when the second electric discharge induction voltage V2 is applied can be the same or can be different. In the first embodiment, the second fixed time T2 indicating the timing when the first electric discharge induction voltage V1 is applied and the second fixed time T2 indicating the timing when the second electric discharge induction voltage V2 is applied can be the same or can be different.

N1 used at step ST15 and N2 used at step ST17 are determination standards for determining whether the electric discharge between the electrode 2 and the workpiece W stabilizes after the jump operation JP ends. N1 and N2, which are the determination standards for determining whether the electric discharge between the electrode 2 and the workpiece W stabilizes after the jump operation JP ends, are set in the machining-condition setting and changing unit 10 by the input device 14. The machining-condition setting and changing unit 10 sets N1 and N2, which are the determination standards for determining whether the electric discharge between the electrode 2 and the workpiece W stabilizes after the jump operation JP ends.

As explained above, the machining-condition setting and changing unit 10 determines at step ST15 whether the counted number of electric discharges reaches 1/N1 (N1 is a natural number) of the maximum number of electric discharges during the last and prior electric discharge machining TA before the jump operation JP at least once and determines at step ST17 whether the counted number of electric discharges reaches 1/N2 (N2 is a natural number) of the maximum number of electric discharges during the last and prior electric discharge machining TA before the jump operation JP at least once to determine whether the electric discharge between the electrode 2 and the workpiece W stabilizes after the jump operation JP ends.

When determining that the electric discharge induction voltage output period Tvup has not elapsed after the jump operation JP ends (Yes at step ST11), in a period before determining at step ST15 that the counted number of electric discharges reaches 1/N1 (N1 is a natural number) of the maximum number of electric discharges during the last and prior electric discharge machining TA before the jump operation JP at least once, that is, in at least a part of a period before determining that the electric discharge stabilizes, the machining-condition setting and changing unit 10 sets the voltage VP to the first electric discharge induction voltage V1 or the second electric discharge induction voltage V2 at which the electric discharge more easily occurs than at the machining voltage V0, which is the condition in applying the electric discharge machining TA. Further, in at least a part of the period before determining that the electric discharge stabilizes after the jump operation JP ends, the machining-condition setting and changing unit 10 applies the first electric discharge induction voltage V1 or the second electric discharge induction voltage V2 between the electrode 2 and the workpiece W.

When applying the first electric discharge induction voltage V1 or the second electric discharge induction voltage V2 between the electrode 2 and the workpiece W, the machining-condition setting and changing unit 10 determines whether the electric discharge between the electrode 2 and the workpiece W stabilizes after the end of the jump operation JP according to the application of the voltage VP illustrated in FIG. 9 and FIG. 10. The machining-condition setting and changing unit 10 applies the machining voltage V0 in a period before determining that the electric discharge stabilizes. When the electric discharge does not occur during the application of the machining voltage V0, the machining-condition setting and changing unit 10 applies the first electric discharge induction voltage V1 or the second electric discharge induction voltage V2 higher than the machining voltage V0.

The machining-condition setting and changing unit 10 determines at step ST15 whether the counted number of electric discharges reaches 1/N1 (N1 is a natural number) of the maximum number of electric discharges during the last and prior electric discharge machining TA before the jump operation JP at least once and determines at step ST17 whether the counted number of electric discharges reaches 1/N2 (N2 is a natural number) of the maximum number of electric discharges during the last and prior electric discharge machining TA before the jump operation JP at least once to determine on the basis of the number of electric discharges that occur during the electric discharge machining TA before the jump operation JP and the number of electric discharges after the end of the jump operation JP whether the electric discharge between the electrode 2 and the workpiece W stabilizes after the jump operation JP ends.

Further, when determining at step ST17 that the counted number of electric discharges reaches 1/N2 (N2 is a natural number) of the maximum number of electric discharges during the last and prior electric discharge machining TA before the jump operation JP at least once after the first electric discharge induction voltage V1 is applied at step ST13, the machining-condition setting and changing unit 10 applies the second electric discharge induction voltage V2 between the electrode 2 and the workpiece W at step ST19 to, in at least a part of a period before determining that the electric discharge stabilizes, change the voltage VP stepwise on the basis of the number of electric discharges that occur during the electric discharge machining TA before the jump operation JP and the number of electric discharges after the end of the jump operation JP.

When determining that the electric discharge induction voltage output period Tvup (illustrated in FIG. 8) has elapsed after the jump operation JP ends (No at step ST11), the machining-condition setting and changing unit 10 switches the voltage VP applied between the electrode 2 and the workpiece W to the machining voltage V0 (step ST21). The machining-condition setting and changing unit 10 outputs, to the voltage/current applying unit 4, the machining conditions including the condition for applying the machining voltage V0. As illustrated in FIG. 8, the voltage/current applying unit 4 applies the machining voltage V0 between the electrode 2 and the workpiece W.

The machining-condition setting and changing unit 10 counts the number of electric discharges per unit time on the basis of a detection result of the occurrence-number-of-electric-discharges detecting unit 6 (step ST22). In the first embodiment, the machining-condition setting and changing unit 10 counts the number of electric discharges in 1 millisecond, which is the unit time. However, the unit time is not limited to 1 millisecond.

The machining-condition setting and changing unit 10 determines whether the counted number of electric discharges reaches N3/N4 (N3 and N4 are natural numbers) of the maximum number of electric discharges during the last and prior electric discharge machining TA before the jump operation JP at least once (step ST23). Note that N3/N4 is a value larger than 1/N1. In the first embodiment, the machining-condition setting and changing unit 10 uses a natural number "3" as N3 and uses a natural number "4" as N4. However, a value of N3 is not limited to 3 and a value of N4 is not limited to 4. When determining that the counted number of electric discharges reaches N3/N4 (N3 and N4 are natural numbers) of the maximum number of electric discharges during the last and prior electric discharge machining TA before the jump operation JP at least once (Yes at step ST23), the machining-condition setting and changing unit 10 determines that the electric discharge between the electrode 2 and the workpiece W stabilizes after the jump operation JP ends, stops the added current ΔA (step ST25), and switches the electric current AP flowing between the electrode 2 and the workpiece W during the electric discharge to the machining current A0. Thereafter, the processing returns to step ST4. Then, the voltage/current applying unit 4 applies the pulse-like machining voltage V0 between the electrode 2 and the workpiece W. When the insulation between the electrode 2 and the workpiece W is broken, the voltage/current applying unit 4 feeds the pulse-like machining current A0 between the electrode 2 and the workpiece W.

When determining that the counted number of electric discharges does not reach N3/N4 (N3 and N4 are natural numbers) of the maximum number of electric discharges during the last and prior electric discharge machining TA before the jump operation JP even once (No at step ST23), the machining-condition setting and changing unit 10 determines that the electric discharge between the electrode 2 and the workpiece W does not stabilize after the jump operation JP ends. The machining-condition setting and changing unit 10 continues the added current ΔA (step ST24). Thereafter, the processing returns to step ST4. Then, the voltage/current applying unit 4 applies the pulse-like machining voltage V0 between the electrode 2 and the workpiece W. When the insulation between the electrode 2 and the workpiece W is broken, the voltage/current applying unit 4 feeds the electric current AP of the sum of the pulse-like machining current A0 and the added current ΔA between the electrode 2 and the workpiece W.

When determining that the current addition output period Taup has elapsed after the jump operation JP ends (No at step ST4), the machining-condition setting and changing unit 10 stops the added current ΔA and switches the electric current AP flowing between the electrode 2 and the workpiece W during the electric discharge to the machining current A0 (step ST31). Then, the voltage/current applying unit 4 applies the pulse-like machining voltage V0 between the electrode 2 and the workpiece W. When the insulation between the electrode 2 and the workpiece W is broken, the pulse-like machining current A0 flows between the electrode 2 and the workpiece W.

The machining-condition setting and changing unit 10 counts the number of electric discharges per unit time on the basis of a detection result of the occurrence-number-of-electric-discharges detecting unit 6 (step ST32). In the first embodiment, the machining-condition setting and changing unit 10 counts the number of electric discharges in 1 millisecond, which is the unit time. However, the machining-condition setting and changing unit 10 is not limited to this. The machining-condition setting and changing unit 10 determines whether the counted number of electric discharges per unit time is larger than a maximum number of electric discharges retained in the storage device 12 (step ST33). When determining that the counted number of electric discharges per unit time is equal to or smaller than the maximum number of electric discharges retained in the storage device 12 (No at step ST33), the machining-condition setting and changing unit 10 updates the maximum number of electric discharges retained in the storage device 12 (step ST34) and returns to step ST1. When determining that the counted number of electric discharges per unit time is larger than the maximum number of electric discharges retained in the storage device 12 (Yes at step ST33), the machining-condition setting and changing unit 10 returns to step ST1.

As explained above, when determining at step ST11 that the electric discharge induction voltage output period Tvup has not elapsed after the jump operation JP ends and determining at step ST12 that electric discharge does not occur after the jump operation JP ends, at step ST13, the machining-condition setting and changing unit 10 outputs, to the voltage/current applying unit 4, machining conditions including a condition for feeding the added current ΔA in addition to the machining current A0 to, in at least a part of the period before determining that the electric discharge stabilizes after the jump operation JP ends, control the machining current A0 to the electric current AP of the sum of the machining current A0 and the added current ΔA at which electric discharge more easily occurs than at the machining current A0.

At step ST13, the machining-condition setting and changing unit 10 outputs, to the voltage/current applying unit 4, the machining conditions including the condition for feeding the added current ΔA in addition to the machining current A0 and feeds the electric current AP of the sum of the machining current A0 and the added current ΔA until determining at step ST23 that the counted number of electric discharges reaches N3/N4 (N3 and N4 are natural numbers) of the maximum number of electric discharges during the last and prior electric discharge machining TA before the jump operation JP at least once to determine whether the electric discharge between the electrode 2 and the workpiece W stabilizes after the jump operation JP ends. The machining-condition setting and changing unit 10 feeds, between the electrode 2 and the workpiece W, the electric current AP higher than the machining current A0 in applying the electric discharge machining TA in at least a part of the period before determining that the electric discharge stabilizes.

At step ST23, the machining-condition setting and changing unit 10 determines whether the counted number of electric discharges reaches N3/N4 (N3 and N4 are natural numbers) of the maximum number of electric discharges during the last and prior electric discharge machining TA before the jump operation JP at least once. Therefore, the machining-condition setting and changing unit 10 determines on the basis of the number of electric discharges that occur during the electric discharge machining TA before the jump operation JP and the number of electric discharges after the end of the jump operation JP whether the electric discharge between the electrode 2 and the workpiece W stabilizes after the jump operation JP ends.

As explained above, in the electric discharge machine 1 according to the first embodiment, the machining-condition setting and changing unit 10 determines whether the electric discharge between the electrode 2 and the workpiece W stabilizes after the jump operation JP ends. In at least a part of the period before determining that the electric discharge stabilizes, the electric discharge machine 1 applies the first electric discharge induction voltage V1 or the second electric discharge induction voltage V2 higher than the machining voltage V0 and feeds the electric current AP of the sum of the machining current A0 and the added current ΔA. Therefore, the electric discharge machine 1 can make it easy to cause electric discharge between the electrode 2 and the workpiece W in the electric discharge induction necessary band TB after the jump operation JP ends and stabilize the electric discharge. As a result, the electric discharge machine 1 can suppress a decrease in machining speed.

In at least a part of the period before determining that the electric discharge stabilizes, the electric discharge machine 1 applies the first electric discharge induction voltage V1 or the second electric discharge induction voltage V2 higher than the machining voltage V0 and feeds the electric current AP of the sum of the machining current A0 and the added current ΔA. Therefore, when determining that the electric discharge stabilizes, the electric discharge machine 1 can prevent the first electric discharge induction voltage V1 or the second electric discharge induction voltage V2 from being applied and prevent the electric current AP of the sum of the machining current A0 and the added current ΔA from being fed. As a result, the electric discharge machine 1 can prevent the excessive voltage VP from being applied and prevent the excessive electric current AP from flowing when determining that the electric discharge stabilizes compared with when the voltage VP higher than the machining voltage V0 is applied even if the electric discharge stabilizes within a predetermined time after the end of the jump operation JP.

In the electric discharge machine 1, the machining-condition setting and changing unit 10 determines whether the electric discharge between the electrode 2 and the workpiece W stabilizes after the jump operation JP ends. In the period before determining that the electric discharge stabilizes, the electric discharge machine 1 applies the first electric discharge induction voltage V1 or the second electric discharge induction voltage V2 when the machining voltage V0 is applied and electric discharge does not occur. Therefore, it is possible to make it easy to cause electric discharge when the machining voltage V0 is applied and electric discharge does not occur. As a result, the electric discharge machine 1 can suppress a decrease in machining speed. The electric discharge machine 1 applies the first electric discharge induction voltage V1 or the second electric discharge induction voltage V2 when the machining voltage V0 is applied and electric discharge does not occur. Therefore, the electric discharge machine 1 does not apply the voltage VP higher than the machining voltage V0 when the machining voltage V0 is applied and electric discharge starts. As a result, the electric discharge machine 1 can prevent the excessively large voltage VP from being applied when the electric discharge occurs.

In the electric discharge machine 1, the machining-condition setting and changing unit 10 determines whether the electric discharge between the electrode 2 and the workpiece W stabilizes after the jump operation JP ends. In at least a part of the period before determining that the electric discharge stabilizes, the electric discharge machine 1 feeds, between the electrode 2 and the workpiece W, the electric current AP of the sum of the machining current A0 and the added current ΔA, the electric current AP being higher than the machining current A0 in applying the electric discharge machining TA. Therefore, when the electric discharge occurs between the electrode 2 and the workpiece W in the electric discharge necessary induction band TB after the jump operation JP ends, the electric discharge machine 1 can increase a machining amount per one electric discharge. As a result, the electric discharge machine 1 can suppress a decrease in machining speed.

The machining-condition setting and changing unit 10 of the electric discharge machine 1 determines on the basis of the number of electric discharges that occur during the electric discharge machining TA before the jump operation JP and the number of electric discharges after the end of the jump operation JP whether the electric discharge between the electrode 2 and the workpiece W stabilizes after the jump operation JP ends. Therefore, the electric discharge machine 1 can accurately determine whether the electric discharge stabilizes. As a result, the electric discharge machine 1 can suppress a decrease in machining speed. The electric discharge machine 1 can prevent the excessively large voltage VP from being applied because the electric discharge machine 1 applies the machining voltage V0 when the electric discharge stabilizes compared with when the voltage VP higher than the machining voltage V0 is applied even if the electric discharge stabilizes within the predetermined time after the jump operation JP ends.

The machining-condition setting and changing unit 10 of the electric discharge machine 1 sets a determination standard for determining whether the electric discharge between the electrode 2 and the workpiece W stabilizes after the jump operation JP ends. Therefore, the electric discharge machine 1 can use an appropriate determination standard according to the electrode 2, the workpiece W, the machining voltage V0, and the machining current A0. The machining-condition setting and changing unit 10 of the electric discharge machine 1 reduces the voltage VP stepwise in at least a part of a period before determining on the basis of the number of electric discharges that occur during the electric discharge machining TA before the jump operation JP and the number of electric discharges after the end of the jump operation JP that the electric discharge stabilizes. According to this processing, the electric discharge machine 1 can reduce the applied voltage VP stepwise as the electrode 2 and the workpiece W come closer to each other and can prevent the excessive voltage VP from being applied.

Second Embodiment

Figure 12:
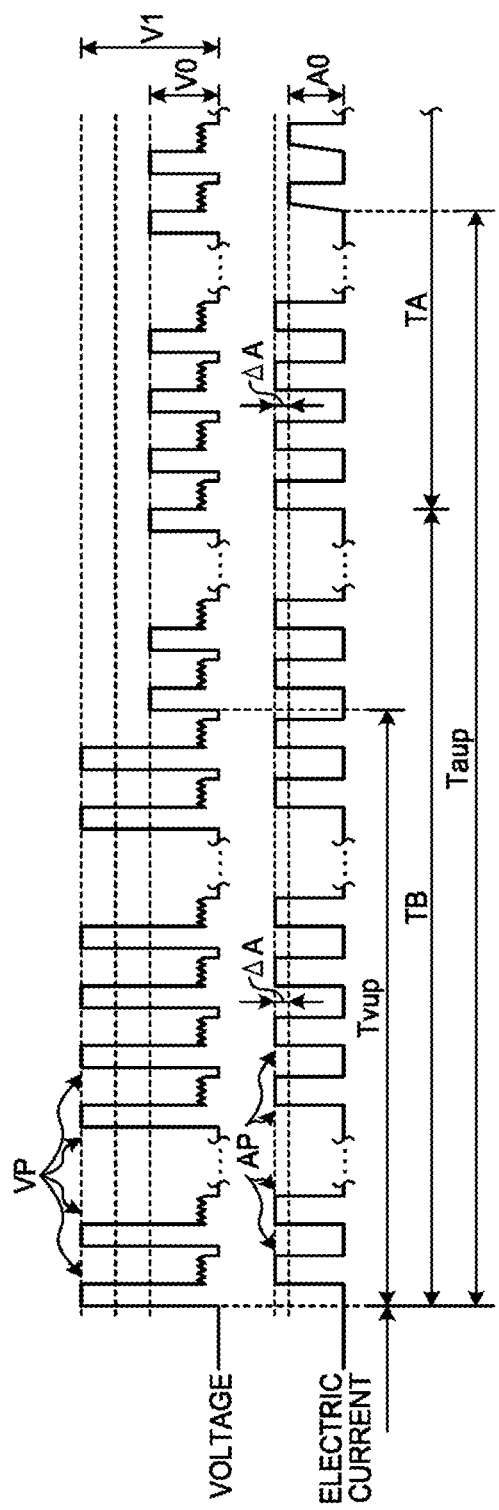
FIG. 12 is a diagram illustrating changes in a voltage and an electric current after the end of a jump operation of an electric discharge machine according to a second embodiment of the present invention.

The electric discharge machine 1 according to a second embodiment of the present invention is explained with reference to the drawings. FIG. 12 is a diagram illustrating changes in a voltage and an electric current after the end of a jump operation of the electric discharge machine according to the second embodiment of the present invention. In FIG. 12, the same portions as the portions in the first embodiment are denoted by the same reference numerals and signs and explanation of the portions is omitted.

The electric discharge machine 1 according to the second embodiment has the same configuration as the configuration in the first embodiment. The electric discharge machine 1 according to the second embodiment executes the same flowchart as the flowchart in the first embodiment except that, when determining at step ST15 that the counted number of electric discharges reaches 1/N1 (N1 is a natural number) of the maximum number of electric discharges during the last and prior electric discharge machining TA before the jump operation JP at least once, the machining-condition setting and changing unit 10 executes step ST18 without executing step ST17. The electric discharge machine 1 according to the second embodiment applies the voltage VP and feeds the electric current AP in the same manner as in the first embodiment except that the electric discharge machine 1 applies the first electric discharge induction voltage V1 in a rectangular waveform when applying the first electric discharge induction voltage V1 while the electric discharge induction voltage output period Tvup has not elapsed after the jump operation JP ends as illustrated in FIG. 12.

In the electric discharge machine 1 according to the second embodiment, as in the first embodiment, the machining-condition setting and changing unit 10 determines whether the electric discharge between the electrode 2 and the workpiece W stabilizes after the jump operation JP ends. The electric discharge machine 1 according to the second embodiment applies the first electric discharge induction voltage V1 higher than the machining voltage V0 and feeds the electric current AP of the sum of the machining current A0 and the added current ΔA, the electric current AP being higher than the machining current A0, in the period before determining that the electric discharge stabilizes. As a result, the electric discharge machine 1 can suppress a decrease in machining speed as in the first embodiment.

The electric discharge machine 1 according to the second embodiment applies the first electric discharge induction voltage V1 in a rectangular waveform when applying the first electric discharge induction voltage V1 after the jump operation JP ends. Therefore, the electric discharge machine 1 can make it easy to immediately cause electric discharge after the jump operation JP ends. As a result, as in the first embodiment, the electric discharge machine 1 in the second embodiment can suppress a decrease in machining speed and prevent the excessively large voltage VP from being applied when electric discharge occurs.

Third Embodiment

Figure 13:
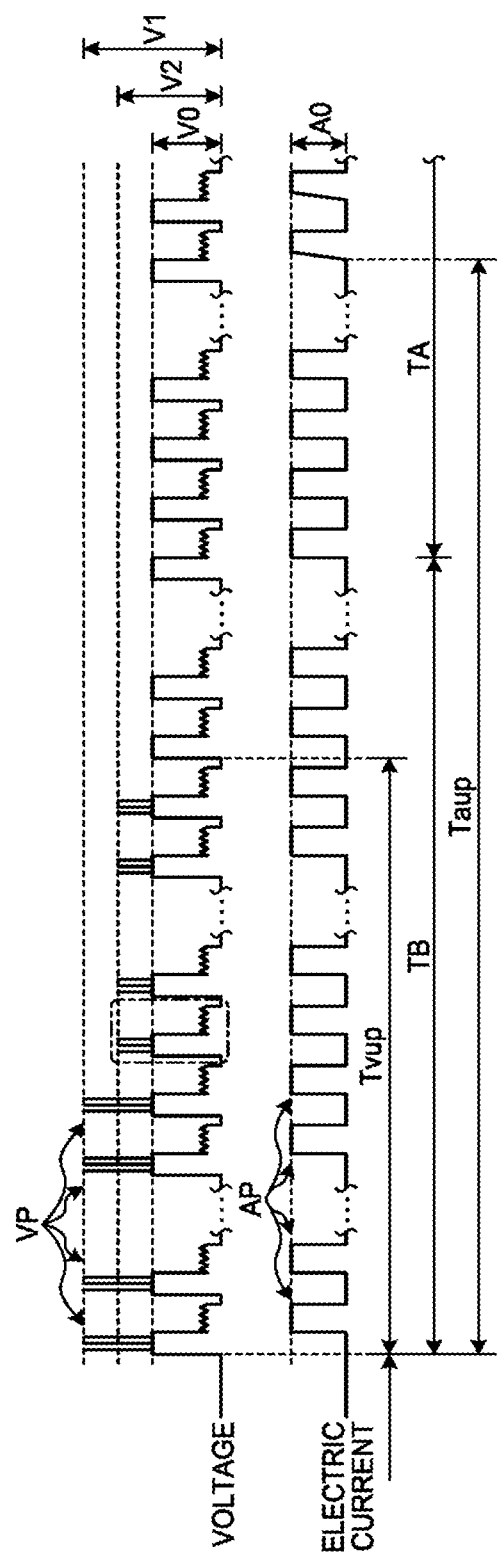
FIG. 13 is a diagram illustrating changes in a voltage and an electric current after the end of a jump operation of an electric discharge machine according to a third embodiment of the present invention.

The electric discharge machine 1 according to a third embodiment of the present invention is explained with reference to the drawings. FIG. 13 is a diagram illustrating changes in a voltage and an electric current after the end of a jump operation of the electric discharge machine according to the third embodiment of the present invention. In FIG. 13, the same portions as the portions in the first embodiment are denoted by the same reference numerals and signs and explanation of the portions is omitted.

The electric discharge machine 1 according to the third embodiment has the same configuration as the configuration in the first embodiment. As shown in FIG. 13, the electric discharge machine 1 according to the third embodiment performs the machining operation PM in the same manner as in the first embodiment except that the electric discharge machine 1 always feeds the machining current A0 between the electrode 2 and the workpiece W when electric discharge occurs after the jump operation JP ends.

In the electric discharge machine 1 according to the third embodiment, as in the first embodiment, the machining-condition setting and changing unit 10 determines whether the electric discharge between the electrode 2 and the workpiece W stabilizes after the jump operation JP ends. In at least a part of the period before determining that the electric discharge stabilizes, the electric discharge machine 1 according to the third embodiment applies the first electric discharge induction voltage V1 or the second electric discharge induction voltage V2 higher than the machining voltage V0 and reduces the applied voltage VP stepwise as the electrode 2 and the workpiece W come closer to each other. As a result, as in the first embodiment, the electric discharge machine 1 can suppress a decrease in machining speed and prevent the excessively large voltage VP from being applied when electric discharge occurs.

Fourth Embodiment

Figure 14:
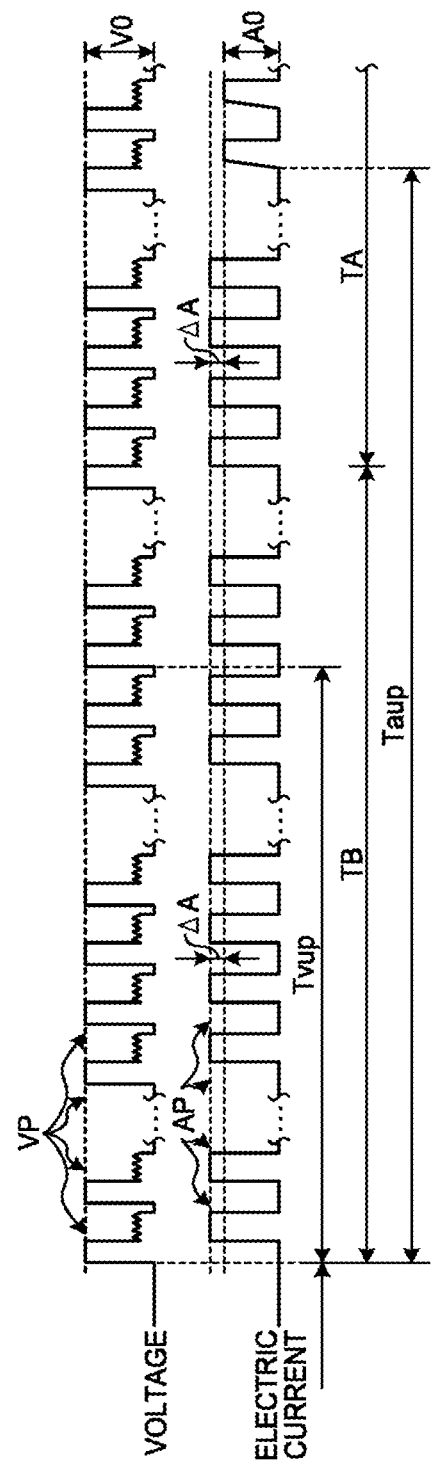
FIG. 14 is a diagram illustrating changes in a voltage and an electric current after the end of a jump operation of an electric discharge machine according to a fourth embodiment of the present invention.

The electric discharge machine 1 according to a fourth embodiment of the present invention is explained with reference to the drawings. FIG. 14 is a diagram illustrating changes in a voltage and an electric current after the end of a jump operation of the electric discharge machine according to the fourth embodiment of the present invention. In FIG. 14, the same portions as the portions in the first embodiment are denoted by the same reference numerals and signs and explanation of the portions is omitted.

The electric discharge machine 1 according to the fourth embodiment has the same configuration as the configuration in the first embodiment. The electric discharge machine 1 according to the fourth embodiment performs the machining operation PM in the same manner as in the first embodiment except that the electric discharge machine 1 always applies the machining voltage V0 between the electrode 2 and the workpiece W after the jump operation JP ends as illustrated in FIG. 14.

In the electric discharge machine 1 according to the fourth embodiment, as in the first embodiment, the machining-condition setting and changing unit 10 determines whether the electric discharge between the electrode 2 and the workpiece W stabilizes after the jump operation JP ends. The electric discharge machine 1 according to the fourth embodiment feeds the electric current AP of the sum of the machining current A0 and the added current ΔA, the electric current AP being higher than the machining current A0, in the period before determining that the electric discharge stabilizes. As a result, the electric discharge machine 1 can suppress a decrease in machining speed as in the first embodiment.

Fifth Embodiment

Figure 15:
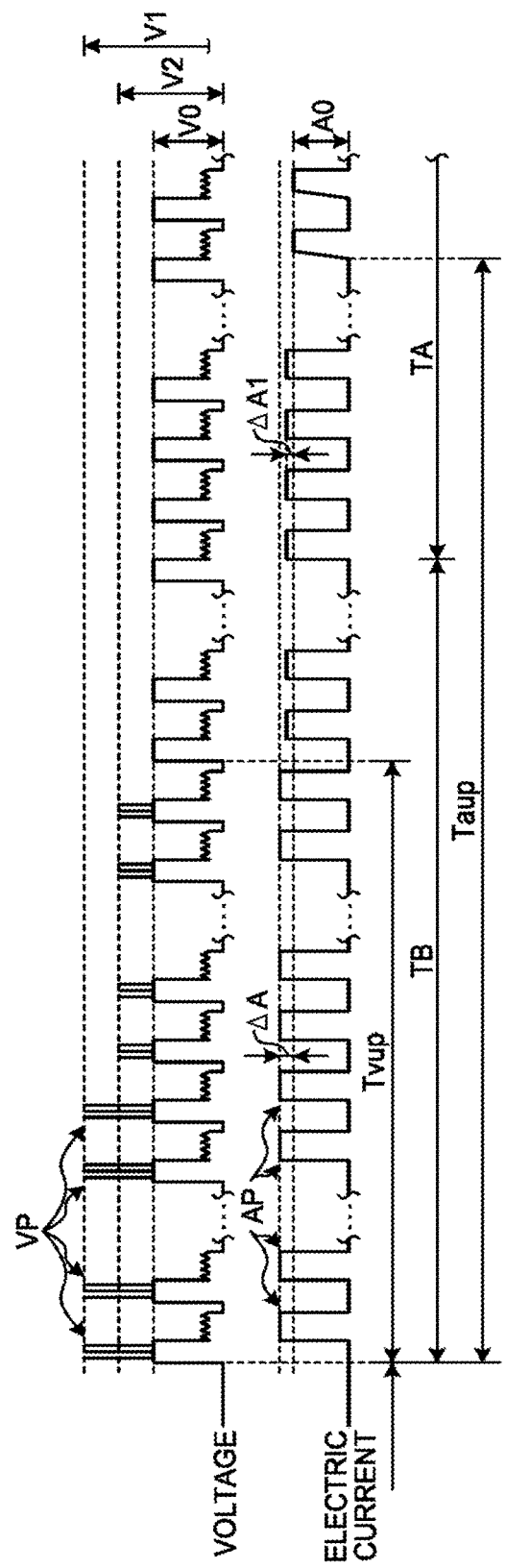
FIG. 15 is a diagram illustrating changes in a voltage and an electric current after the end of a jump operation of an electric discharge machine according to a fifth embodiment of the present invention.

The electric discharge machine 1 according to a fifth embodiment of the present invention is explained with reference to the drawings. FIG. 15 is a diagram illustrating changes in a voltage and an electric current after the end of a jump operation of the electric discharge machine according to the fifth embodiment of the present invention. In FIG. 15, the same portions as the portions in the first embodiment are denoted by the same reference numerals and signs and explanation of the portions is omitted.

The electric discharge machine 1 according to the fifth embodiment has the same configuration as the configuration in the first embodiment. The electric discharge machine 1 according to the fifth embodiment performs the machining operation PM in the same manner as in the first embodiment except that, as illustrated in FIG. 15, the electric discharge machine 1 feeds, between the electrode 2 and the workpiece W, the electric current AP of the sum of the machining current A0 and the added current ΔA until the electric discharge induction voltage output period Tvup elapses after the jump operation JP ends and feeds, between the electrode 2 and the workpiece W, the electric current AP of the sum of the machining current A0 and a second added current ΔA1 lower than the added current ΔA until the electric discharge induction voltage output period Tvup elapses and the current addition output period Taup elapses.

In the electric discharge machine 1 according to the fifth embodiment, as in the first embodiment, the machining-condition setting and changing unit 10 determines whether the electric discharge between the electrode 2 and the workpiece W stabilizes after the jump operation JP ends. The electric discharge machine 1 according to the fifth embodiment applies the first electric discharge induction voltage V1 or the second electric discharge induction voltage V2 higher than the machining voltage V0 and feeds the electric current AP higher than the machining current A0 in at least a part of the period before determining that the electric discharge stabilizes. As a result, the electric discharge machine 1 can suppress a decrease in machining speed as in the first embodiment.

In the electric discharge machine 1 according to the fifth embodiment, in at least a part of the period before determining on the basis of the number of electric discharges that occur during the electric discharge machining TA before the jump operation JP that the electric discharge stabilizes, the machining-condition setting and changing unit 10 controls the voltage VP and the electric current AP stepwise and reduces the applied voltage VP and the flowing electric current AP stepwise as the electrode 2 and the workpiece W come closer to each other. As a result, the electric discharge machine 1 can prevent the excessively large voltage VP from being applied and prevent the excessive electric current AP from flowing when electric discharge occurs.

Sixth Embodiment

Figure 16:
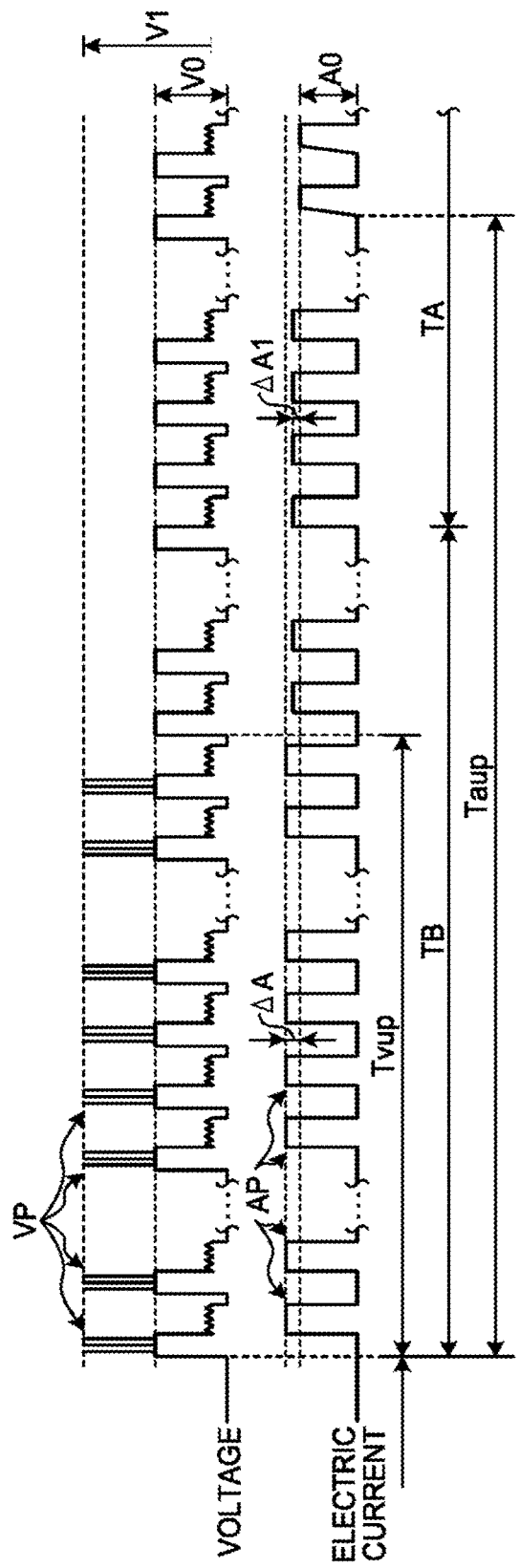
FIG. 16 is a diagram illustrating changes in a voltage and an electric current after the end of a jump operation of an electric discharge machine according to a sixth embodiment of the present invention.

The electric discharge machine 1 according to a sixth embodiment of the present invention is explained with reference to the drawings. FIG. 16 is a diagram illustrating changes in a voltage and an electric current after the end of a jump operation of the electric discharge machine according to the sixth embodiment of the present invention. In FIG. 16, the same portions as the portions in the first embodiment are denoted by the same reference numerals and signs and explanation of the portions is omitted.

The electric discharge machine 1 according to the sixth embodiment has the same configuration as the configuration in the first embodiment. As illustrated in FIG. 16, the electric discharge machine 1 according to the sixth embodiment feeds, between the electrode 2 and the workpiece W, the electric current AP of the sum of the machining current A0 and the added current ΔA until the electric discharge induction voltage output period Tvup elapses after the jump operation JP ends. The electric discharge machine 1 according to the sixth embodiment feeds, between the electrode 2 and the workpiece W, the electric current AP of the sum of the machining current A0 and the second added current ΔA1 lower than the added current ΔA until the electric discharge induction voltage output period Tvup elapses and the current addition output period Taup elapses. Further, the electric discharge machine 1 according to the sixth embodiment performs the machining operation PM in the same manner as in the first embodiment except that the electric discharge machine 1 applies the first electric discharge induction voltage V until the electric discharge induction voltage output period Tvup elapses after the jump operation JP ends.

In the electric discharge machine 1 according to the sixth embodiment, as in the first embodiment, the machining-condition setting and changing unit 10 determines whether the electric discharge between the electrode 2 and the workpiece W stabilizes after the jump operation JP ends. The electric discharge machine 1 according to the sixth embodiment applies the first electric discharge induction voltage V1 higher than the machining voltage V0 and feeds the electric current AP higher than the machining current A0 in at least a part of the period before determining that the electric discharge stabilizes. As a result, the electric discharge machine 1 can suppress a decrease in machining speed as in the first embodiment.

In the electric discharge machine 1 according to the sixth embodiment, the period before determining on the basis of the number of electric discharges that occur during the electric discharge machining TA before the jump operation JP that the electric discharge stabilizes, the machining-condition setting and changing unit 10 controls the electric current AP stepwise and reduces the flowing electric current AP stepwise as the electrode 2 and the workpiece W come closer to each other. As a result, the electric discharge machine 1 can prevent the excessive electric current AP from flowing when electric discharge occurs.

The configurations explained in the embodiments above indicate examples of the contents of the present invention and can be combined with other publicly-known technologies or a part of the configurations can be omitted or changed in a range not departing from the spirit of the present invention.

REFERENCE SIGNS LIST 1 electric discharge machine, 2 electrode, 3 shaft-feed driving unit, 4 voltage/current applying unit, 5 shaft-feed control unit, 6 occurrence-number-of-electric-discharges detecting unit, 10 machining-condition setting and changing unit (machining-condition setting unit), JP jump operation, TA electric discharge machining, V0 machining voltage (condition in applying electric discharge machining), V1 first electric discharge induction voltage (condition in which electric discharge easily occurs), V2 second electric discharge induction voltage (condition in which electric discharge easily occurs), A0 machining current (condition in applying electric discharge machining), ΔA added current (condition in which electric discharge easily occurs), ΔA1 second added current (condition in which electric discharge easily occurs)

The invention claimed is:
1. An electric discharge machine comprising:
an electrode opposed to a workpiece;
a shaft-feed driving member to move the electrode in a direction in which the electrode is brought close to the workpiece and a direction in which the electrode moves away from the workpiece;
a voltage/current applying circuit to apply a voltage between the electrode and the workpiece to cause electric discharge and feed an electric current between the electrode and the workpiece;

a shaft-feed controller to cause the shaft-feed driving member to perform a jump operation during a machining operation; and a machining-condition setting circuit to set the voltage applied between the electrode and the workpiece by the voltage/current applying circuit and the electric current flowing between the electrode and the workpiece, wherein the machining-condition setting circuit determines whether the electric discharge between the electrode and the workpiece stabilizes after the jump operation ends and, in at least a part of a period before determining that the electric discharge stabilizes, sets at least one of the voltage and the electric current to a condition in which electric discharge more easily occurs than in a condition at a time when electric discharge machining is applied.

2. The electric discharge machine according to claim 1, wherein the machining-condition setting circuit determines whether the electric discharge between the electrode and the workpiece stabilizes after the jump operation ends and, in at least a part of the period before determining that the electric discharge stabilizes, applies, between the electrode and the workpiece, a voltage higher than a machining voltage in applying the electric discharge machining.

3. The electric discharge machine according to claim 2, wherein the machining-condition setting circuit determines whether the electric discharge between the electrode and the workpiece stabilizes after the jump operation ends, applies the machining voltage in the period before determining that the electric discharge stabilizes, and, when the electric discharge does not occur during the application of the machining voltage, applies the voltage higher than the machining voltage between the electrode and the workpiece.

4. The electric discharge machine according to claim 1, wherein the machining-condition setting circuit determines whether the electric discharge between the electrode and the workpiece stabilizes after the jump operation ends and, in at least a part of the period before determining that the electric discharge stabilizes, feeds, between the electrode and the workpiece, an electric current higher than a machining current in applying the electric discharge machining.

5. The electric discharge machine according to claim 1, further comprising an occurrence-number-of-electric-discharges detecting circuit to detect the electric discharge that occurs between the electrode and the workpiece, wherein the machining-condition setting circuit determines on the basis of a number of electric discharges that occur during the electric discharge machining before the jump operation and a number of electric discharges after the end of the jump operation whether the electric discharge between the electrode and the workpiece stabilizes after the jump operation ends.

6. The electric discharge machine according to claim 1, wherein the machining-condition setting circuit sets a determination standard for determining whether the electric discharge between the electrode and the workpiece stabilizes after the jump operation ends.

7. The electric discharge machine according to claim 1, wherein the machining-condition setting circuit changes, on the basis of a number of electric discharges that occur during the electric discharge machining before the jump operation and a number of electric discharges after the end of the jump operation, at least one of the voltage and the electric current stepwise in at least a part of the period before determining that the electric discharge stabilizes after the jump operation ends.

8. The electric discharge machine according to claim 1, wherein, when determining that the electric discharge stabilizes, the machining-condition setting circuit switches at least one of the voltage and the electric current from the condition in which the electric discharge easily occurs to the condition in applying the electric discharge.

9. The electric discharge machine according to claim 1, wherein the machining-condition setting circuit determines whether the electric discharge between the electrode and the workpiece stabilizes after the jump operation ends and, in the period before determining that the electric discharge stabilizes, applies, between the electrode and the workpiece, a voltage higher than the machining voltage in a degree in which the electric discharge occurs when the electric discharge machining is applied.

\* \* \* \* \*